May 24, 1932.  J. F. O'CONNOR  1,859,712
CAR DOOR CONSTRUCTION
Filed Feb. 21, 1930
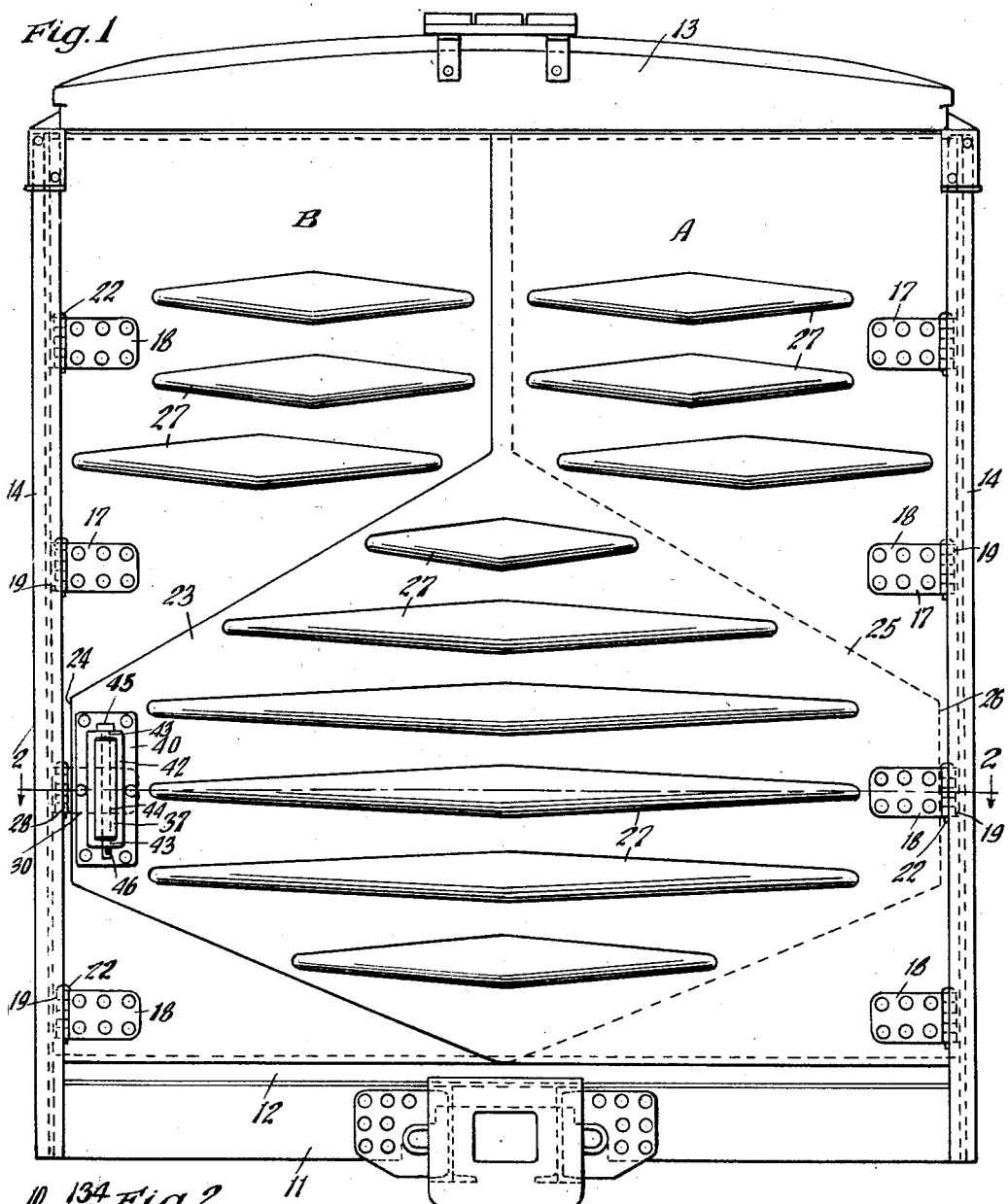
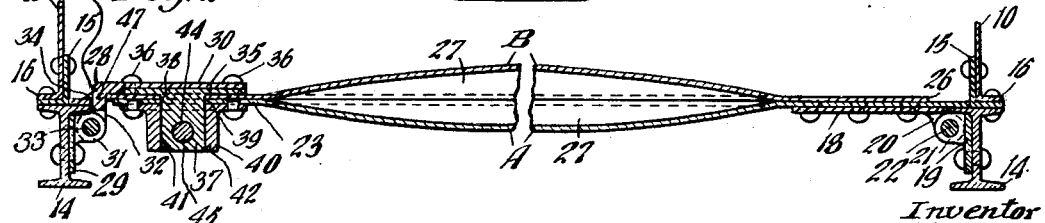
Witness
Wm. Geiger
Inventor
John F. O'Connor
By Joseph Harris
His Atty Patented May 24, 1932

1,859,712

UNITED STATES PATENT OFFICE

JOHN F. O'CONNOR, OF CHICAGO, ILLINOIS, ASSIGNOR TO W. H. MINER, INC., OF CHICAGO, ILLINOIS, A CORPORATION OF DELAWARE

CAR DOOR CONSTRUCTION

Application filed February 21, 1930. Serial No. 430,182.

This invention relates to improvements in car door construction, especially designed for use as end doors for railway cars of the automobile type.

One object of the invention is to provide a double door construction having exceptionally great strength to resist outward thrusts wherein the doors overlap each other to a considerable extent to reinforce each other at those portions subjected to the greatest outward thrusts by the lading within the car.

Another object of the invention is to provide a door construction of the character indicated in the preceding paragraph, wherein the doors form the end wall of the car and are overlapped throughout the width of the car, when closed, to provide a wall section of double thickness.

A more specific object of the invention is to provide an end door structure for railway cars of the automobile type, including a pair of door members each hinged along the vertical outer edge to one of the side wall members of the car and having their inner edges meeting, when the doors are closed, said doors also having overlapping sections corresponding in width to the width of the door opening to provide a door structure of double thickness where needed to resist outwardly directed end thrusts and blows due to shifting of the lading within the car.

Other objects of the invention will more clearly appear from the description and claims hereinafter following.

In the drawings, forming a part of this specification, Figure 1 is an end elevational view of a railway car of the automobile type, illustrating my improvements in connection therewith, the truck structure and associated parts being omitted in this view. And Figure 2 is a transverse, horizontal, sectional view corresponding substantially to the line 2—2 of Figure 1.

In said drawings, 10—10 designate the side wall members of the railway car, 11 the end sill, 12 the threshold of the end door and 13 the transverse roof structure forming the upper member of the door frame.

In carrying out my invention, I provide a pair of vertically disposed reinforcing I-beam members 14—14 along the vertical end edges of the side walls 10 of the car. The webs of the I-beam members 14 are arranged parallel to the longitudinal axis of the car and a reinforcing angle plate member 15 is interposed between the inner flange of each I-beam and an out-turned angular flange portion 16 on the end wall 10 of the car. As most clearly shown in Figure 2, each angle bar or plate 15 has one arm thereof secured to the inner side face of the corresponding wall 10 and the other arm thereof interposed between the flange 16 of said wall and the inner flange portion of the corresponding I-beam 14.

My improved double door end structure for the car comprises a pair of swinging door member A and B hinged along their vertical outer edges to the side wall members of the car. As most clearly shown in Figure 1, the door A is hinged along its vertical outer edge to the I-beam member 14 at the righthand side of the car, by a plurality of strap hinge members 17—17. As shown, the hinge members 17 are preferably four in number and spaced approximately equal distances from each other. Each hinge member 17 comprises a strap portion 18 riveted to the door member A and a strap portion 19 secured to the web of the I-beam 14 by rivets extending therethrough. The hinge strap 18 has an outwardly offset hinge eye portion 20 which cooperates with a laterally inwardly offset hinge eye portion 21 on the hinge strap 19, the eye portions 20 and 21 being connected by the usual hinge pin indicated by 22. As will be evident, by offsetting the hinge eye portions of the hinge strap members as shown, the door A will swing about such an axis that the outer edge portion of the door will engage in back of the inner flange member of the I-beam 14 when the door is closed, thereby relieving the hinge members from strain due to outward thrusts on the door. The door B is also swingingly supported along its outer edge by means of a plurality of hinge members similar to the hinge members 17 hereinbefore described, and having hinge strap sections similar to the strap sections 18 and 19 and secured to the door B and the web of the corresponding I-beam member 14 respectively. As most clearly shown in Figure 1, the door B is provided with three hinge members 17, one being at the lower edge thereof and in transverse alinement with the lower hinge member of the door A and the other two being at the upper portion of said door and in substantial transverse alinement with the two upper hinge members of the door A. The pivotal axes of the hinge members 17 of the door B are also so disposed that the door, when closed, will have the outer edge portion thereof engaged in back of the inner flange of the corresponding I-beam 14. Each door member A and B is of a width at the lower portion thereof to correspond approximately to the width of the door opening, the door A being provided with an extension 23 at the lower portion thereof which overlaps the main body portion of the door B and has the outer edge portion 24 thereof disposed closely adjacent the corresponding side of the door opening. The door B is provided with a similar extension 25 which engages in back of the main body portion of the door A and has the outer edge 26 thereof disposed closely adjacent the corresponding side wall 10 of the car. The upper portions of the doors A and B are provided with vertical edge portions which overlap slightly, when the doors are closed, as shown in Figure 1. Both door members are suitably reinforced by transverse corrugations 27—27, the corrugations 27 of the overlapping portions of the two doors projecting in opposite directions, as clearly illustrated in Figure 2.

Between the two lower hinge members 17 of the door member B a special hinge member 28 is provided, this hinge member being preferably in transverse alinement with the second hinge member from the bottom edge of the door A. As most clearly illustrated in Figure 2, the hinge member 28 comprises an outer hinge strap member 29 and an inner hinge strap member 30, the outer hinge strap member 29 being fixed to the web of the I-beam 14 and having a laterally projecting eye portion 31 cooperating with an outwardly projecting eye portion 32 on the hinge strap 30. The hinge eyes 31 and 32 are pivotally connected by the usual hinge pin 33. The hinge eye 32 is connected to the strap 30 by means of an arm 134 extending through an opening 34 in the door member B. The hinge strap 30 has a plate member 35 secured thereto, the plate member being interposed between the strap 30 and the inner surface of the door B. The hinge strap 30, the plate 35 and the door B are secured together by rivets 36 extending therethrough. The plate 35 is provided with an outwardly projecting locking lug 37 which extends through an opening 38 provided in the door B and projects through a similar opening 39 provided in the door A and extends outwardly beyond said door when the doors are closed, as clearly illustrated in Figure 2. The door A is provided with a casting 40 secured to the outer side thereof and having an opening 41 in alinement with the opening 39 of the door A, the opening 41 being reinforced by suitable flanges 42—42 surrounding the same and forming top, bottom and side walls. The top and bottom walls 42 of the casting and the lug 37 are provided with alined locking pin receiving openings 43 and 44 adapted to accommodate a locking pin 45. As clearly shown in Figure 1, the locking pin 45 is headed at the upper end thereof and has a seal receiving opening 46 at the bottom end thereof adapted to receive the usual car seal member.

In order that the door B, which is overlapped by the door A, will closely fit the door opening along the hinged edge thereof, said hinged edge is outwardly offset, as indicated at 47, to fit against the rear surface of the innermost flange of the I-beam 14 at the corresponding side of the door opening.

As will be evident, when the doors are closed and locked, a wall structure of double thickness is provided at the lower portion of the door opening, which wall portion of double thickness spans the width of said door opening, thereby thoroughly bracing the door structure at this point. Inasmuch as the overlapping door sections are locked together and the outer edges of both doors are engaged in back of the flanges of the I-beam members when the doors are in closed position, the door structure forms a substantially solid end wall member extending entirely across the width of the car and giving approximately double the strength of double door members having their inner edges abutting.

I have herein shown and described what I now consider the preferred manner of carrying out my invention, but the same is merely illustrative and I contemplate all changes and modifications that come within the scope of the claims appended hereto.

I claim:

1. In an end door structure for railway cars, the combination with side walls of a car; of a pair of doors hinged along their outer edges to said side walls, said doors having, when closed, sections thereof overlapping, said overlapping sections approximating in width the width of the door opening.

2. In an end door structure for railway cars, the combination with the side walls of a car; of a pair of doors hinged along their outer edges, each door having a section thereof of a width substantially equal to the width of the door opening, said sections of said doors overlapping when the doors are closed to provide a double wall structure.

3. In an end door structure for railway cars, the combination with a door frame; of a door member hinged along one vertical edge to one of the side members of said frame and having a section extending approximately to the other vertical side member of the door frame; a second door hinged along its vertical edge to said last named vertical side member of the door frame and having a section overlapping the other door member, when closed, and extending approximately to said first named side member.

4. In a double door construction for railway cars, the combination with a member having a door opening therein; of a pair of doors hinged along their outer edges to said member and overlapping each other, when closed, approximately throughout the width of said door opening.

5. In an end door structure for railway cars, the combination with the side walls of a car; of a pair of door members hinged along their outer edges to said side walls, said door members having inner vertical meeting edge portions, and each door having a projecting portion adapted to overlap the main body portion of the other door when said doors are closed.

6. In an end door structure for railway cars, the combination with the side walls of a car; of a pair of door members hinged along their outer edges to said side walls, said door members having overlapping vertical inner edge portions, each door having an extension beyond said inner edge portion thereof, said extension overlapping the main body portion of the other door when said doors are closed.

7. In an end door structure for railway cars, the combination with the side walls of a car; of a pair of door members hinged along their outer edges to said side walls respectively, one of said door members having a portion extending entirely across the car and overlapping the other door when closed.

8. In an end door structure for railway cars, the combination with the side walls of a car; of a pair of door members hinged along their outer edges to said side walls respectively, one of said door members having a portion extending entirely across the car and overlapping the other door when closed; and means for locking the edge of said overlapping portion to the other door adjacent the hinged edge of the latter.

9. In an end door structure for railway cars, the combination with the side walls of a car; of a pair of door members hinged along the outer edges to said side walls respectively, each of said door members having a portion extending across the major portion of said door opening when the doors are closed, said extension of each door overlapping the main body portion of the other door; and means for securing the extension of one door to the other adjacent the hinged edge of the latter.

10. In an end door structure for railway cars, the combination with the side walls of a car; of a pair of door members, one of said door members overlapping the other door member throughout the major portion of the width of the door opening, said overlapping member having one edge hinged to the side wall of the car and the other edge secured to the other side wall when said doors are closed.

11. In an end door structure for railway cars, the combination with a door opening; of a pair of door members, each of said door members extending across a portion of the lower section of said door opening, and said members being hinged to opposite side walls of the door opening.

12. In an end door structure for railway cars, the combination with a door opening; of a pair of door members, each of said door members extending across the major portion of the lower section of the door opening and each having one edge thereof hinged to one of said side walls of the door opening, one of said doors overlapping the other; and means for securing the free edge portion of said overlapping door to the adjacent side wall member of the door opening.

13. In an end door structure for railway cars, the combination with a member provided with a door opening; of a pair of doors hinged along their outer edges, for closing said opening, one of said doors being of a width approximating the width of the door opening and overlapping the first named door; a locking lug on the overlapped door adjacent the hinged edge thereof; an opening in the other door adjacent the free edge thereof adapted to receive said locking lug when said doors are closed; and means for securing said lug to said last named door.

14. In an end door structure for railway cars, the combination with a member provided with a door opening; of a pair of doors hinged along their outer edges, for closing said opening, one of said doors being of a width approximating the width of the door opening and overlapping the first named door; and means for securing said doors together, including a hinged member fixed to the overlapped door and the adjacent wall of the door opening, said hinge having locking means thereon adapted to be locked to the other door member.

In witness that I claim the foregoing I have hereunto subscribed my name this 19th day of February, 1930.

JOHN F. O'CONNOR.